US012535764B2

(12) United States Patent
Tezuka

(10) Patent No.: US 12,535,764 B2
(45) Date of Patent: Jan. 27, 2026

(54) IMAGE FORMING DEVICE

(71) Applicant: CANON KABUSHIKI KAISHA, Tokyo (JP)

(72) Inventor: Shuntaro Tezuka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 18/593,740

(22) Filed: Mar. 1, 2024

(65) Prior Publication Data

US 2024/0302786 A1 Sep. 12, 2024

(30) Foreign Application Priority Data

Mar. 7, 2023 (JP) ................................ 2023-034300

(51) Int. Cl.

*G03G 21/16* (2006.01)
*G03G 15/00* (2006.01)
*G03G 15/20* (2006.01)

(52) U.S. Cl.

CPC ..... *G03G 21/1619* (2013.01); *G03G 15/2039* (2013.01); *G03G 15/2064* (2013.01); *G03G 15/657* (2013.01)

(58) Field of Classification Search

CPC ........... G03G 21/1619; G03G 15/2039; G03G 15/2064; G03G 15/657
USPC .......................................................... 399/328
See application file for complete search history.

(56) References Cited

U.S. PATENT DOCUMENTS

2020/0180885 A1* 6/2020 Matsumoto .............. B65H 9/18
2023/0280682 A1* 9/2023 Matsuda ............ G03G 15/2053 399/69

FOREIGN PATENT DOCUMENTS

| | | | |
|---|---|---|---|
| JP | H04181110 | A | 6/1992 |
| JP | H07129024 | A | 5/1995 |
| JP | 2001282036 | A | 10/2001 |
| JP | 2004196464 | A | 7/2004 |
| JP | 2010114479 | A | 5/2010 |
| JP | 2012078787 | A | 4/2012 |
| JP | 2015165281 | A | 9/2015 |
| JP | 2016033085 | A | 3/2016 |
| JP | 2020143732 | A | 9/2020 |

* cited by examiner

*Primary Examiner* — Stephanie E Bloss
*Assistant Examiner* — Michael A Harrison
(74) *Attorney, Agent, or Firm* — Canon U.S.A., Inc., IP Division

(57) ABSTRACT

An image forming device includes a fixing unit to fix a toner image to a recording material while heating the recording material, a frame unit provided with a guide portion to guide the recording material to the fixing unit, and a width detector provided in a portion of the frame unit in which the guide portion is provided to detect a recording material width. The frame unit has a first mounting hole to which the width detector is attached and a second mounting hole. The second mounting hole is provided at a position that differs from a position of the first mounting hole in a recording material width direction, the second mounting hole further is provided in the portion of the frame unit in which the guide portion is provided, and the width detector is attachable in the second mounting hole but not attached to the second mounting hole.

12 Claims, 14 Drawing Sheets

IMAGE FORMING DEVICE

BACKGROUND

Field

The present disclosure relates to an image forming device, such as a copying machine, a laser printer, or the like.

Description of the Related Art

An electrophotographic image forming device includes a fixing unit that fixes a toner image to a recording material while heating the recording material on which the toner image has been formed. It is known that, when an image is formed on a narrow recording material, the temperature of a portion of the fixing unit through which the recording material does not pass rises, which is referred to herein as a temperature rise in a sheet non-passing portion.

One way to suppress a temperature rise in a sheet non-passing portion when an image is formed on a narrow recording material is to make the conveyance interval of the recording material larger than when an image is formed on a wide recording material.

Japanese Patent Laid-Open No. 2001-282036 describes a technology that provides a fixing unit having a temperature detection element for detecting a temperature rise in a sheet non-passing portion and increases the conveyance interval when the temperature detected by this element exceeds a reference temperature.

Japanese Patent Laid-Open No. 2020-143732 describes a technology that provides a width detector that detects the width of a recording material in the conveyance path of the recording material and changes the conveyance interval of the recording material in accordance with the detection result of the width detector.

As described above, there is a device that takes measures against a temperature rise in a sheet non-passing portion by using a fixing unit with a temperature detection element that detects a temperature rise in a sheet non-passing portion, a device that takes measures against a temperature rise in a sheet non-passing portion by using a width detector that detects the width of the recording material, and a device that includes both the temperature detection element and the width detector. Which one of these structures is selected depends on the required specification (product grade) of the device and the like. When a plurality of image forming devices having different optimal structures have common components, the manufacturing costs of the image forming devices can be reduced.

SUMMARY

The present disclosure provides an image forming device in which the mounting position of a width detector that detects the width of a recording material can be changed.

According to an aspect of the present disclosure, an image forming device includes a fixing unit configured to fix a toner image to a recording material while heating the recording material on which the toner image is formed, a frame unit provided with a guide portion configured to guide the recording material to be conveyed to the fixing unit, and a width detector configured to detect a width of the recording material, wherein the width detector is provided in a portion of the frame unit in which the guide portion is provided, wherein the frame unit has a first mounting hole to which the width detector is attached and a second mounting hole, and wherein the second mounting hole is provided at a position that differs from a position of the first mounting hole in a width direction of the recording material, the second mounting hole further is provided in the portion of the frame unit in which the guide portion is provided, and the width detector is attachable in the second mounting hole but not attached to the second mounting hole.

Further features of the present disclosure will become apparent from the following description of exemplary embodiments with reference to the attached drawings.

DESCRIPTION OF THE EMBODIMENTS

Preferable exemplary examples of the present disclosure will be described in detail below. However, the dimensions, materials, shapes, and relative positions of components described in the examples below should be changed as appropriate depending on the structure and various conditions of a device to which the present disclosure is applied. Accordingly, unless otherwise specified, the scope of the present disclosure is not limited to the dimensions, materials, shapes, and relative positions.

Example 1

Image Forming Device

Figure 1:
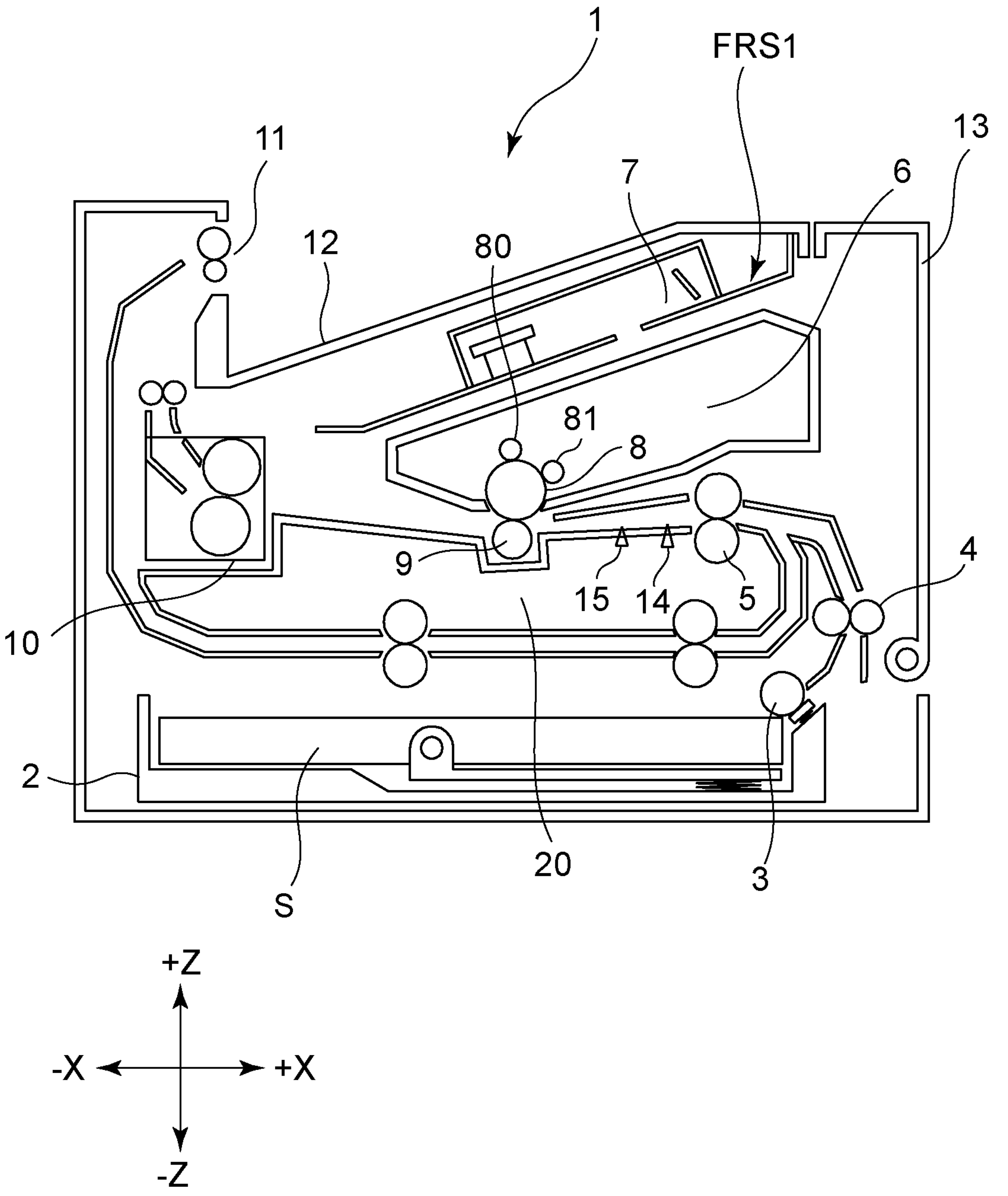
FIG. 1 is a sectional view of an image forming device.

The overall structure of a printer (an image forming device) 1 according to example 1 will be described with reference to FIGS. 1 to 3. The printer 1 is an electrophotographic printer to which a process cartridge 6 in which a photosensitive member 8, a charger 80, and a developer 81 are integrated is attached so as to be replaceable through a door 13 of the printer 1 in an open state. A known electrophotographic process of forming a toner image on a recording material S will be briefly described below.

When an engine controller of the printer 1 receives a print instruction, the rotating photosensitive member 8 is electrically charged by the charger 80 and scanned with laser light corresponding to image information sent from an external device. Reference numeral 7 denotes a scanner unit that emits laser light. The process cartridge 6 stores toner. The electrostatic latent image formed on the photosensitive member 8 is developed with toner supplied by the developer 81. In parallel with this image forming process, the recording materials S, such as plain paper, loaded in a sheet feeding cassette 2 are picked up one by one by a sheet feeding roller 3, conveyed by a conveying roller 4, and waits at the position of a registration roller pair 5. Then, the recording material S is conveyed by the registration roller pair 5 to a transfer nip portion at which the photosensitive member 8 abuts the transfer roller 9 in synchronization with the toner image on the photosensitive member 8. The transfer roller 9 causes the transfer nip portion to transfer the toner image on the photosensitive member 8 onto the recording material S. The unfixed toner image transferred from the photosensitive member 8 onto the recording material S by the transfer nip portion is heat-fixed to the recording material S by the fixing unit 10. The recording material S having passed through the fixing unit 10 is discharged onto a discharge tray 12 via a discharge roller 11.

Figure 2:
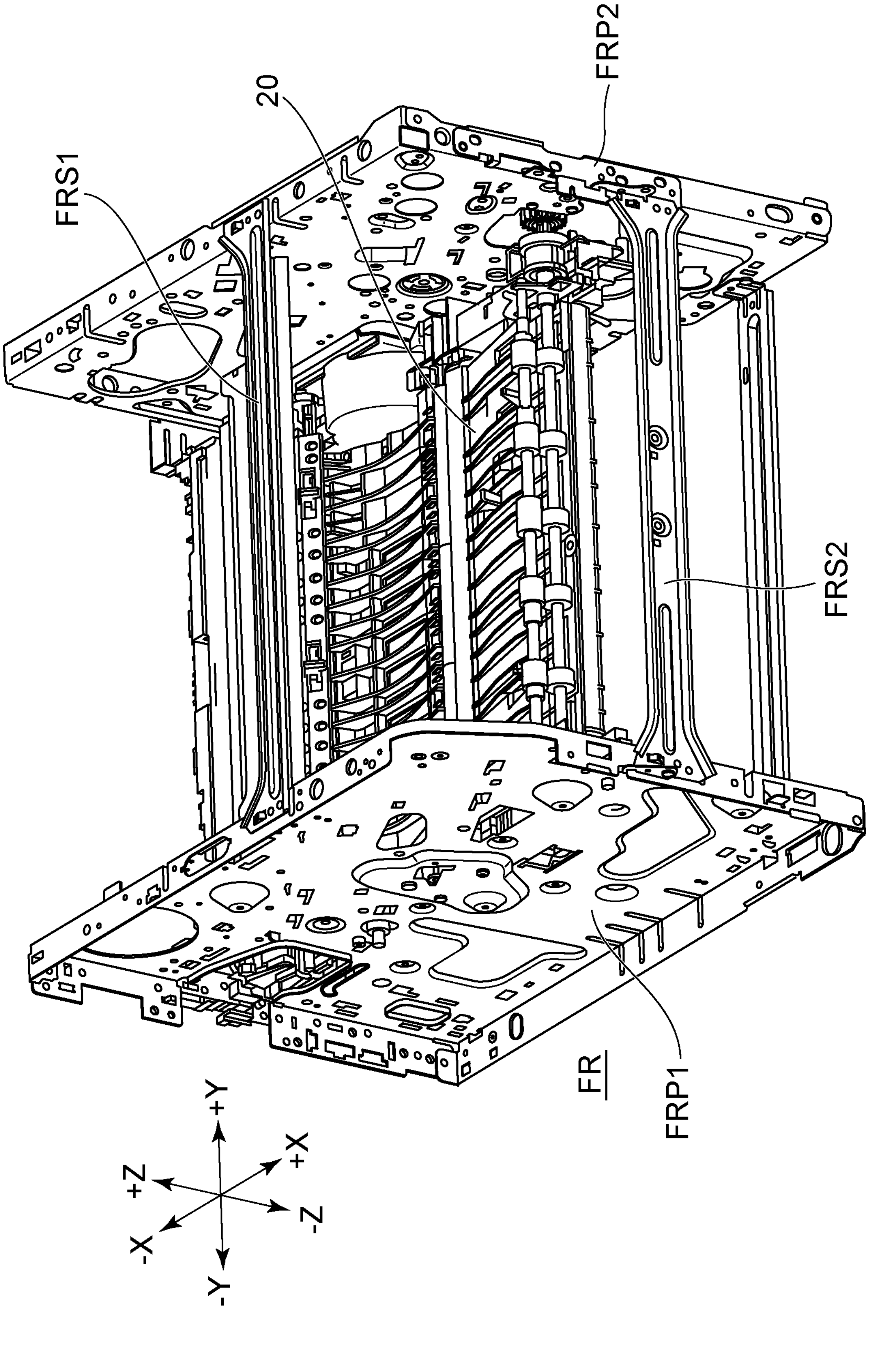
FIG. 2 is a perspective view of a frame of a printer.
Figure 3:
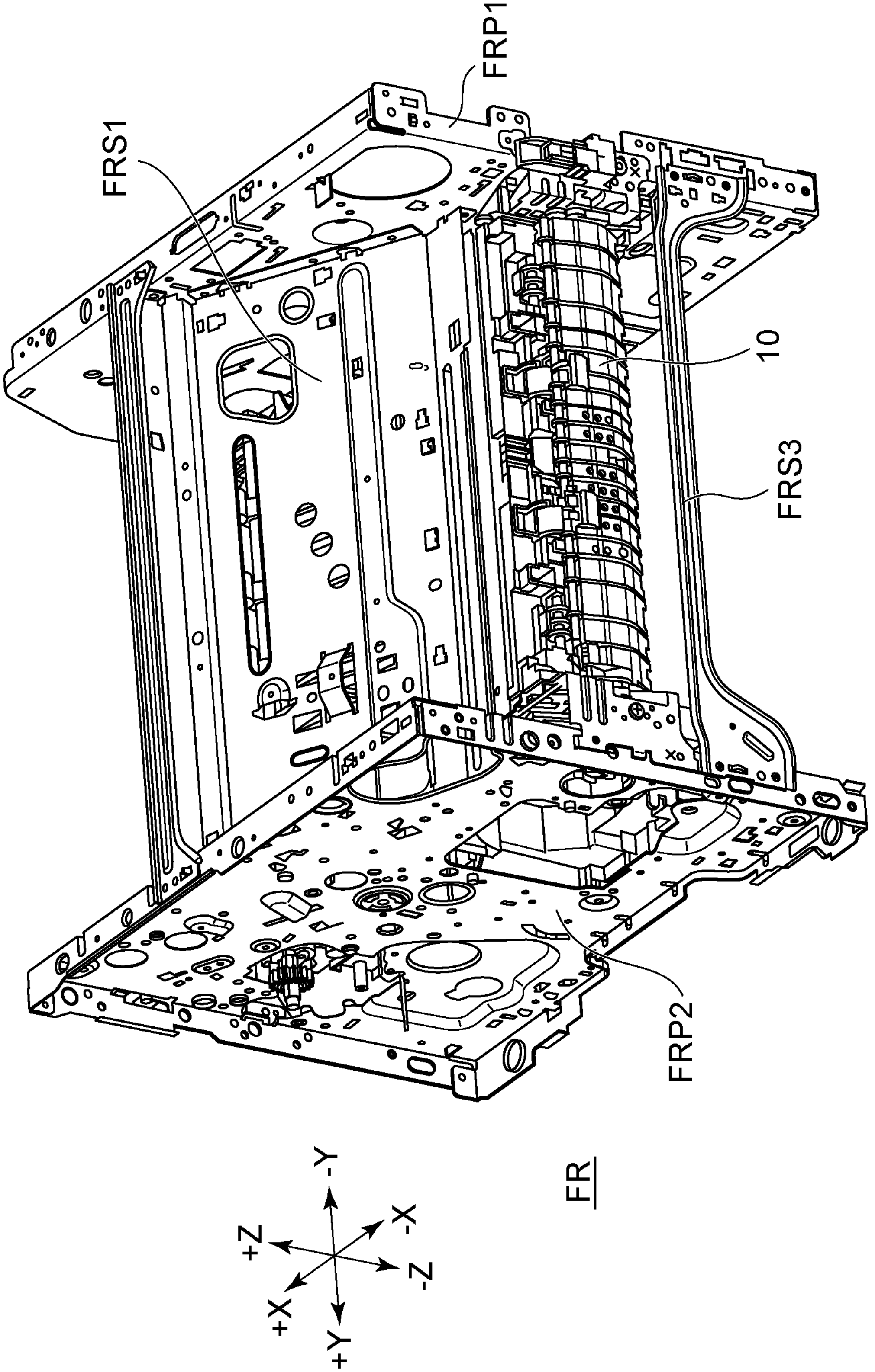
FIG. 3 is a perspective view of the frame of the printer.

In FIG. 2, FR denotes a frame of the printer 1. The frame FR includes two metal side plates FRP1 and FRP2, metal stays FRS1 to FRS3 disposed between and fixed to the side plates FRP1 and FRP2, and a frame unit 20 that is a resin stay. A scanner unit 7 is fixed to the stay FRS1.

Sheet width sensors 14, which constitute a width detector detecting the length (width) of the recording material S in a direction orthogonal to a conveyance direction of the recording material S, and a registration sensor 15, which detects the timing of passage of the recording material S, are disposed in the vicinity of the registration roller pair 5. The sheet width sensors 14 and the registration sensor 15 are attached to the frame unit 20.

Sheet Width Sensor

Figure 4:
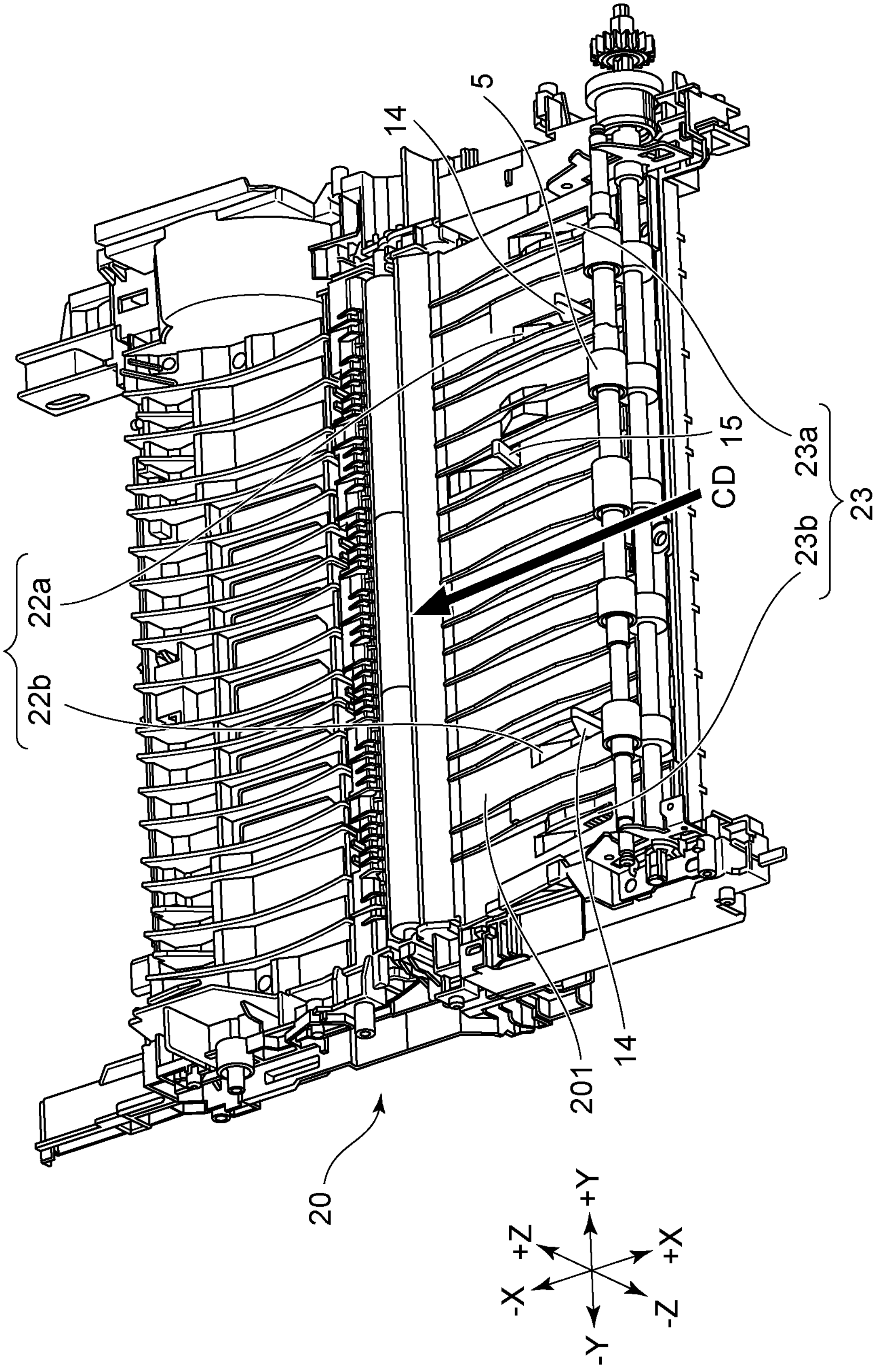
FIG. 4 is a perspective view of a frame unit.

Next, the structure of the sheet width sensor 14 will be described with reference to FIG. 4. FIG. 4 is a perspective view of the frame unit 20. It should be noted that arrow CD indicates the conveyance direction of the recording material S. As illustrated in FIGS. 1 and 4, the frame unit 20 has a guide portion 201 that guides the recording material S from the registration roller pair 5 to the fixing unit 10. The pair of sheet width sensors 14 is disposed in a portion of the guide portion 201 from the registration roller pair 5 to the transfer nip portion.

Each of the sheet width sensors 14 is secured in the mounting hole (first mounting hole) 22 provided in the guide portion 201. In addition, in a portion of the frame unit 20 in which the guide portion 201 is provided, a mounting hole (second mounting hole) 23 is provided at a position that differs from the position of the mounting hole 22 in the width direction of the recording material S. The mounting hole 23 is a hole in which the sheet width sensor 14 is attachable but not attached. The mounting hole 23 has the following advantages.

For example, a scenario in which another second printer that differs from the printer 1 (for convenience, referred to as the first printer) in product grade is considered. For example, the first printer supports A4 size (210 mm×297 mm) (maximum print size is letter size (216 mm×279 mm)) and can perform printing on an A4-size or letter-size recording material at a throughput of 60 ppm (pages per minute). The second printer supports A4 size (maximum print size is letter size) and can perform printing on an A4-size or letter-size recording material at a throughput of 55 ppm. Even when the frame unit 20 of the first printer is used as the frame unit 20 of the second printer and the mounting position of the sheet width sensor 14 needs to be changed to a position suitable for the second printer, the mounting hole 23 in the example can be used. Accordingly, the position of the sheet width sensor 14 can be changed to a position suitable for the second printer.

Fixing Unit

Figure 5:
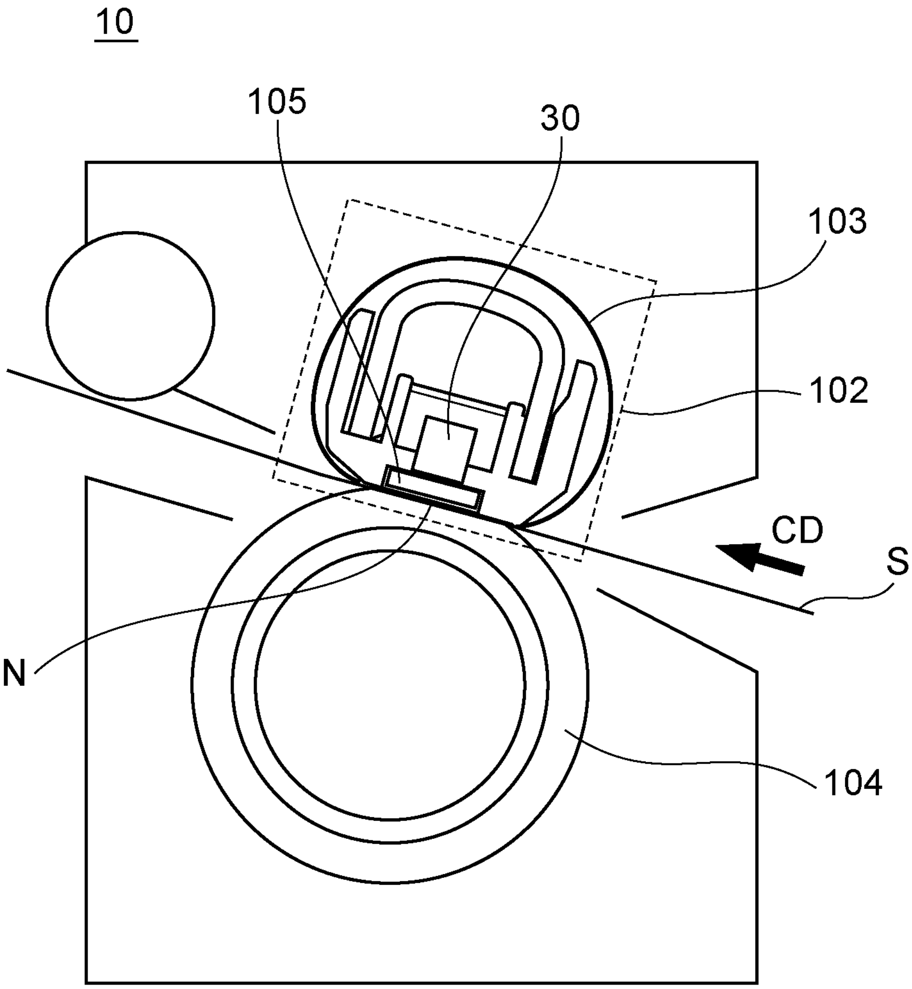
FIG. 5 is a sectional view of a fixing unit.

Next, the schematic structure of the fixing unit 10 will be described with reference to FIG. 5. The fixing unit 10 includes a heating unit 102 and a pressure roller 102 that forms a fixing nip portion N together with the heating unit 102. The heating unit 102 includes a flexible cylindrical film 103, a heater 105 disposed in the internal space surrounded by a film 103, and a thermistor (temperature detection element) 30 that detects the temperature of the heater 105. The heater 105 has a ceramic substrate on which a heating resistor is printed. The length of the heating resistor in the longitudinal direction of the heater 105 is 216 mm, which is the same as the width of the letter-size recording material S. In addition, the heater 105 has a simple structure with fixed heat distribution in the longitudinal direction.

The fixing nip portion N is formed between the film 103 and the pressure roller 102 by the film 103 being sandwiched by the heater 105 and the pressure roller 102. The pressure roller 102 rotates by receiving motive power from a motor, which is not illustrated, and the film 103 rotates by following the pressure roller 102. The recording material S on which a toner image has been formed is heated while being conveyed by the fixing nip portion N.

As a result, the toner image is fixed to the recording material S. Since the fixing unit 10 is detachably attached to the frame FR of the printer body, the fixing unit 10 can be replaced with a new one if necessary. In addition, the fixing unit described above of the second printer can also be attached to the frame 13.

Disposition of Thermistors and Sheet Width Sensors in First Printer

Figure 6:
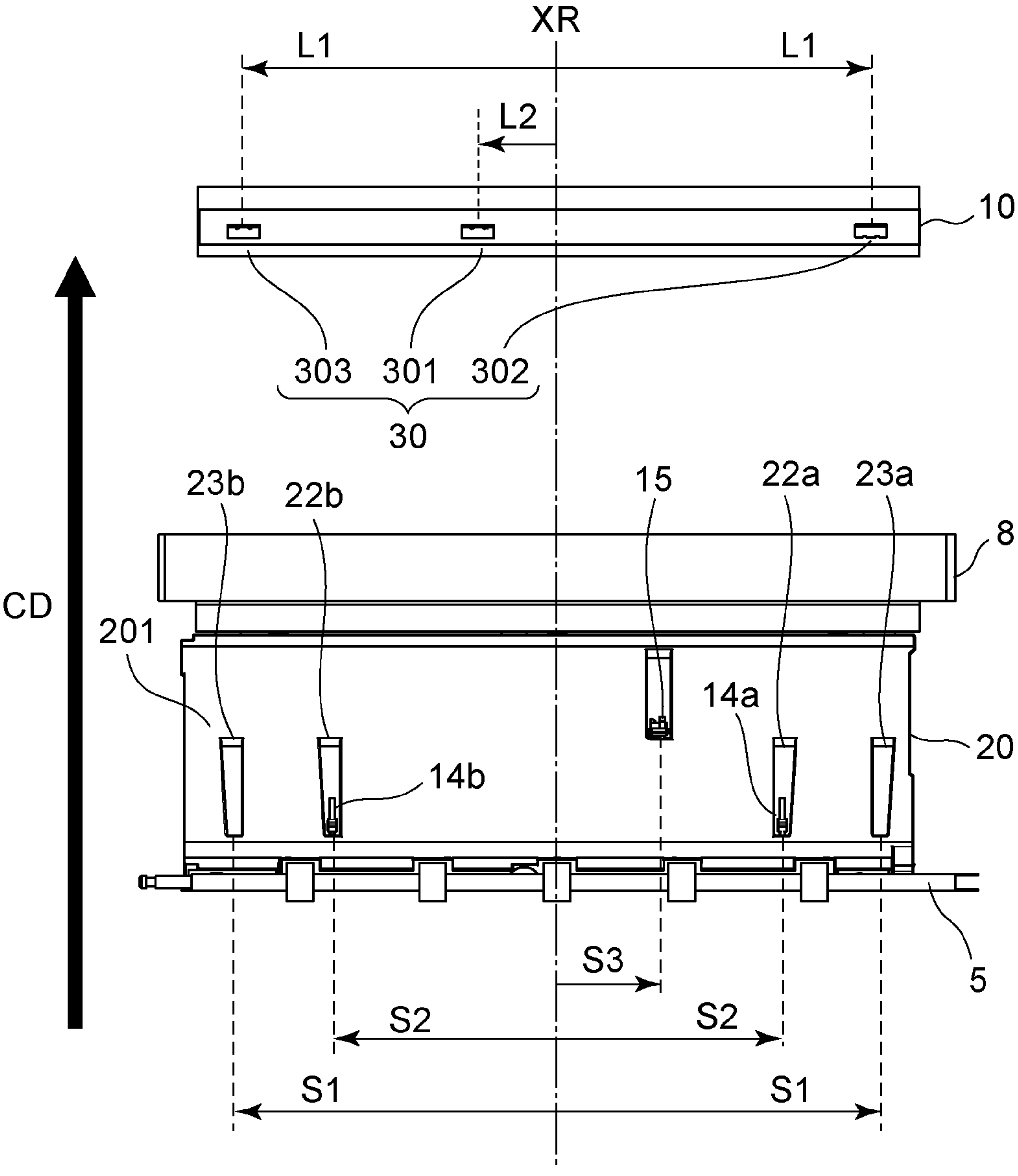
FIG. 6 is a diagram illustrating the positional relationship between sheet width sensors and thermistors of a first printer according to example 1.

The disposition of the thermistors 30 and the sheet width sensors 14 in the printer 1 (first printer) according to the example will be described with reference to FIG. 6. The fixing unit 10 of the printer 1 includes three thermistors 301, 302, and 303 that all detect the temperature of the heater 105. In FIG. 6, X indicates the conveyance reference of the recording material S. The printer 1 is designed such that the middle of the recording material S in the width direction is aligned with a conveyance reference XR regardless of the size of the recording material S.

Figure 14B:
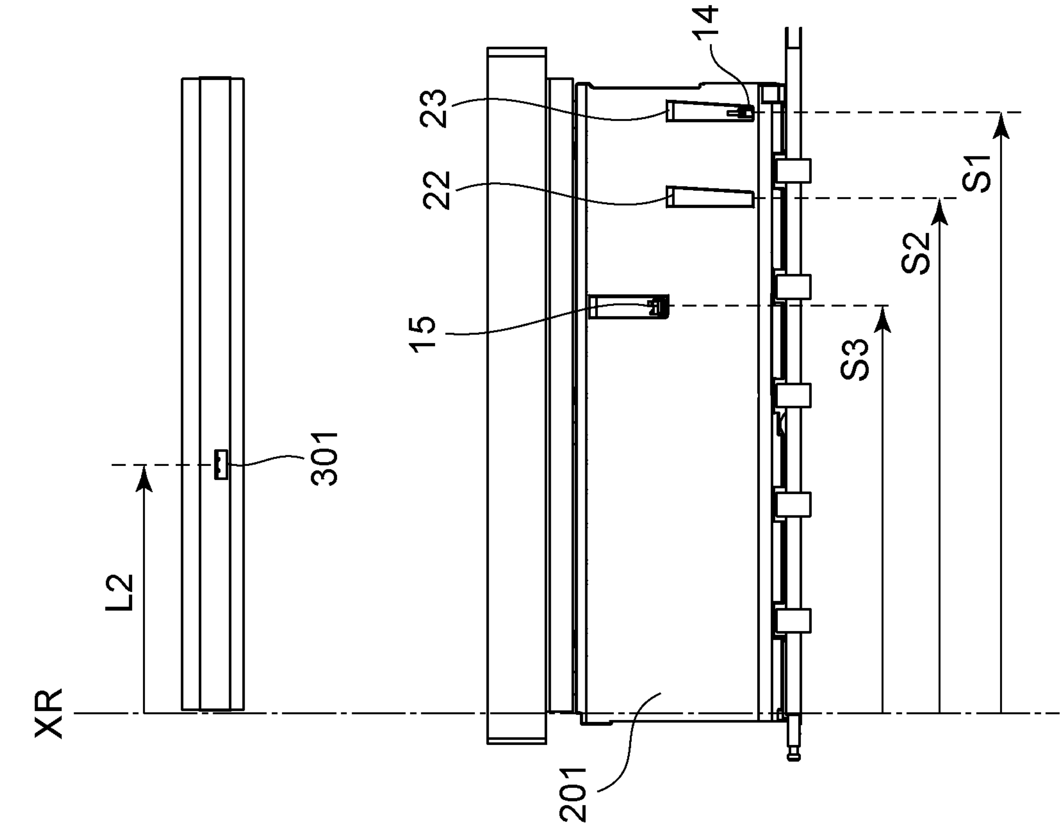
FIGS. 14A and 14B are diagrams illustrating a modification example of example 1.
Figure 14A:
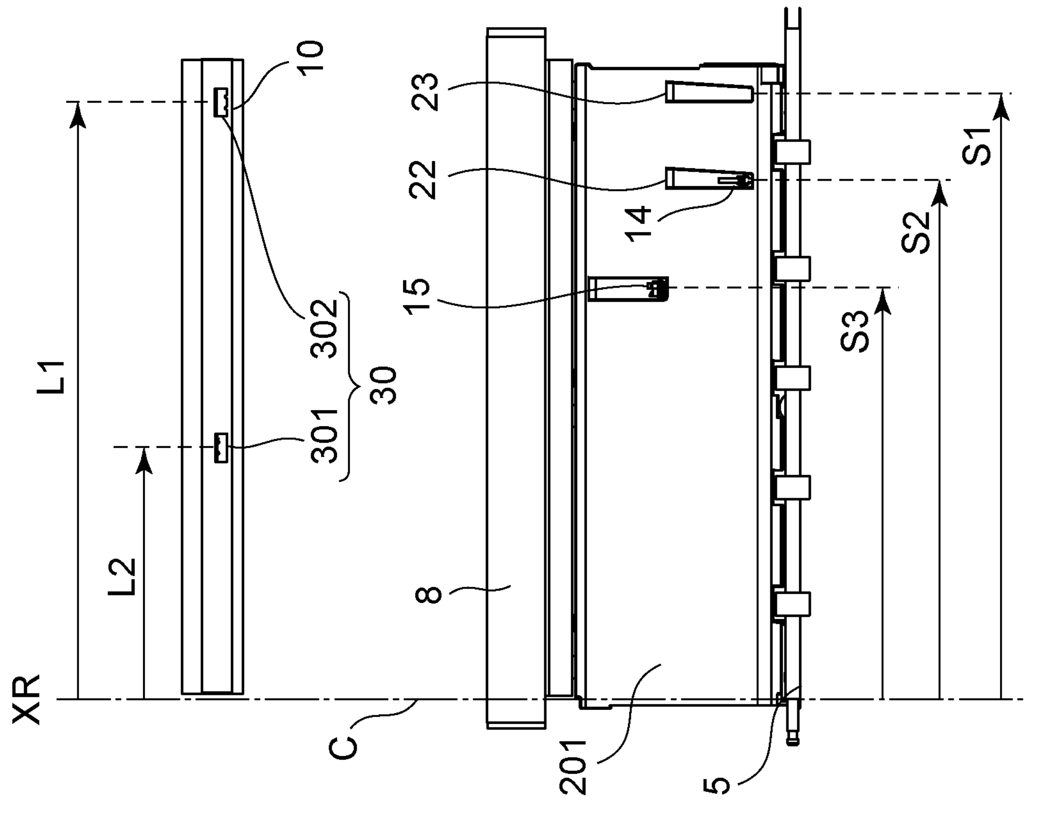

The printer 1 according to the example conveys the recording material S such that the middle of the recording material S in the width direction is aligned with the conveyance reference XR. However, as illustrated in FIGS. 14A and 14B, the present disclosure may be applied to a printer in which the recording material S is conveyed such that one side of the recording material S in the conveyance direction CD is aligned with a conveyance reference that differs from the conveyance reference XR, regardless of the size of the recording material S. It should be noted that FIG. 14A corresponds to the first printer and FIG. 14B corresponds to the second printer.

The main thermistor (first temperature detection element) 301 is disposed near the conveyance reference XR, and the sub-thermistors (second temperature detection elements) 302 and 303 are disposed away from the conveyance reference XR. The main thermistor 301 is used to maintain the temperature of the heater 105. In other words, when the toner image is fixed to the recording material S, power supply to the heater 105 is controlled such that the detected temperature of the main thermistor 301 is maintained at a target temperature. The sub-thermistors 302 and 303 detect a temperature rise in a sheet non-passing portion of the heater 105.

The main thermistor 301 is disposed at a distance L2 from the conveyance reference XR, and the sub-thermistor 302 is disposed at a distance L1 from the conveyance reference XR. The sub-thermistor 303 is disposed at the distance L1 from the conveyance reference XR in a direction opposite to the position of the sub-thermistor 302 with respect to the conveyance reference XR.

Here, the distance L1 in the sheet width direction corresponds to a position at which it is possible to determine whether the recording material S being printed is the recording material S for which the throughput (number of prints per unit time) of the printer 1 is maximized. In the printer 1 according to the example, which supports A4 size, the sub-thermistors 302 and 303 are disposed at the positions at the distance L1 corresponding to approximately 100 mm, which is less than ½ the width (210 mm) of the A4-size recording material. Accordingly, when the recording material S having a width of less than 200 mm is passed, the sub-thermistors 302 and 303 detect a temperature rise in a sheet non-passing portion and can reduce the throughput. On the other hand, the A4-size or larger recording material S can be printed at the maximum throughput.

Next, the disposition of the sheet width sensor 14 will be described. As illustrated in FIG. 6, mounting holes 22*a* and 22*b* and mounting holes 23*a* and 23*b* are provided in the guide portion 201. Here, the mounting holes 22*a* and 22*b* are disposed at a distance S2, which is less than the distance L1 in the sheet width direction at which the sub-thermistors 302 and 303 are disposed. In addition, the mounting holes 23*a* and 23*b* are disposed at a distance S1 (100 mm), which substantially coincides with the distance L1 at which the sub-thermistors 302 and 303 are disposed in the sheet width direction.

Since the printer 1 (first printer) uses the fixing unit 10 including the sub-thermistors 302 and 303, sheet width sensors 14*a* and 14*b* are disposed in the mounting holes 22*a* and 22*b*. Here, the distance S2 in the sheet width direction corresponds to a position at which it is possible to determine the recording material (A5 size for the first printer) for which the throughput is maximized second. In the first printer, the sheet width sensors 14*a* and 14*b* are disposed at a distance of 71 mm, which is less than ½ the width of the recording material S having a width of 148 mm (A5 size). Accordingly, the throughput during printing on the recording material S having a width of less than 142 mm is made lower than the throughput during printing on the A4-size recording material S in accordance with the detection results of the sheet width sensors 14*a* and 14*b*. Accordingly, a temperature rise in a sheet non-passing portion can be suppressed in the fixing unit 10.

Specifically, when the user provides a print instruction for printing on the A4-size or letter-size recording material S, printing at 60 ppm is performed. When the user provides a print instruction for printing on the A5-size recording material S, printing at 45 ppm is performed. When the sub-thermistors 302 and 303 detect a temperature rise in a sheet non-passing portion during continuous printing, the throughput is reduced to 25 ppm. When the user provides a print instruction for printing on the A6-size or smaller recording material S, printing at 35 ppm is performed. When the sub-thermistors 302 and 303 detect a temperature rise in a sheet non-passing portion during continuous printing, the throughput is reduced to 20 ppm.

In the first printer, the sheet width sensors 14*a* and 14*b* cannot distinguish between A5 size and A4 size. However, the sheet width sensors 14*a* and 14*b* can determine whether the recording material S that is actually being conveyed is larger than A5 size. Accordingly, when the recording material S that is actually being conveyed is A5 size, the throughput after the sub-thermistors 302 and 303 detect a temperature rise in a sheet non-passing portion during the printing can be set to 25 ppm instead of 20 ppm, which is the throughput for A6 size. This is because the sheet width sensors 14*a* and 14*b* have determined that the recording material S that is actually being conveyed is larger than A5 size and a temperature rise in a sheet non-passing portion of A5 size printing is gentler than that of A6 size printing. In addition, the initial throughput of A5 size printing can be set to 45 ppm instead of 35 ppm, which is the initial throughput of A6 size. This is because, even if the size of the recording material S actually conveyed is A6 when the size of the recording material S set by the user is A5, the sheet width sensors 14*a* and 14*b* can immediately determine that the actual size differs from the size specified by the user.

As described above, in the first printer having the fixing unit 10 that can detect a temperature rise in a sheet non-passing portion by using the sub-thermistors 302 and 303, the sheet width sensors 14*a* and 14*b* are disposed inside the sub-thermistors 302 and 303. This can maximize the throughput of the small (A5 size) recording material S.

Disposition of Thermistors and Sheet Width Sensors in Second Printer

Figure 7:
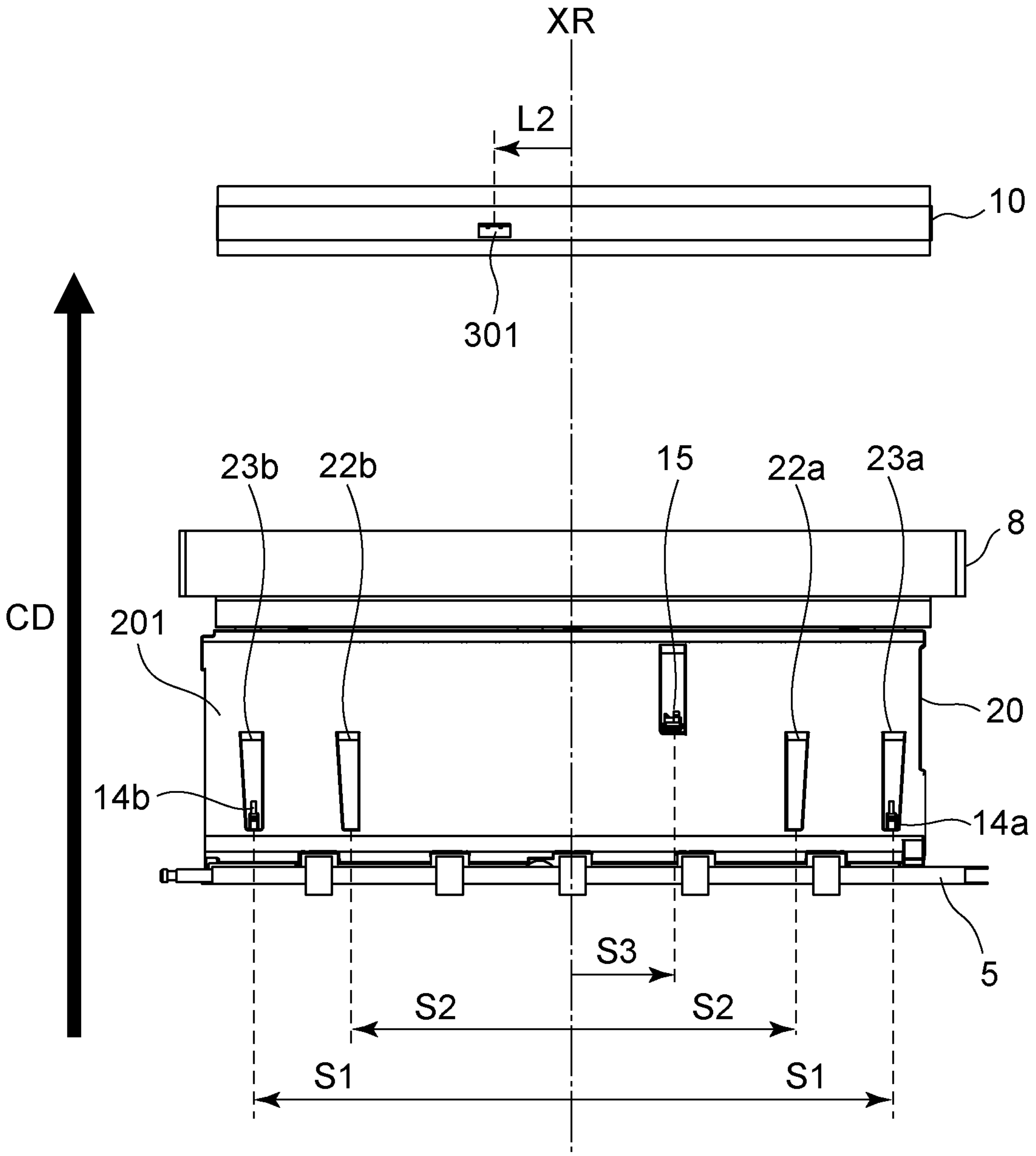
FIG. 7 is a diagram illustrating the positional relationship between sheet width sensors and thermistors of a second printer according to example 1.

Next, an example of the disposition of the thermistor 301 and the sheet width sensors 14*a* and 14*b* of the second printer including the fixing unit (second fixing unit) having a structure that differs from that of the printer 1 (first printer) will be described with reference to FIG. 7. The frame unit 20 of the second printer has the same structure as the frame unit 20 of the first printer except that the mount positions of the sheet width sensors 14*a* and 14*b* differ from those of the first printer. In addition, the second fixing unit has only the main thermistor 301 and does not have the sub-thermistors. That is, the fixing unit has only one temperature detection element.

The sheet width sensors 14*a* and 14*b* of the second printer are disposed in the mounting holes (first mounting holes) 23*a* and 23*b*. That is, the mounting holes 23*a* and 23*b* for the sheet width sensors 14*a* and 14*b* are further from the conveyance reference XR of the recording material than the mounting holes 22*a* and 22*b* in the width direction. Specifically, the sheet width sensors 14*a* and 14*b* are provided at the distance S1 (=100 mm) from the conveyance reference XR. As a result, when the recording material S with a width of less than 200 mm is passed, printing at a low throughput can be performed in accordance with the detection results of the sheet width sensors 14*a* and 14*b*. It should be noted that, in the second printer, the mounting holes 22*a* and 22*b* correspond to the second mounting holes.

In this structure, even the second printer including the fixing unit that does not have the sub-thermistors 302 and 303 can maximize the throughput of the A4-size or larger recording material S. Specifically, when the user provides a print instruction for printing on the A4-size or letter-size recording material S, printing at 55 ppm is performed. When the user provides a print instruction for printing on the A5-size or smaller recording material S, printing at 30 ppm is performed. When the number of continuous prints reaches the threshold during continuous printing, it is assumed that a temperature rise in a sheet non-passing portion has occurred in printing of the recording material S of the smallest size set in the second printer, and the throughput is reduced to 20 ppm.

Figure 8A:
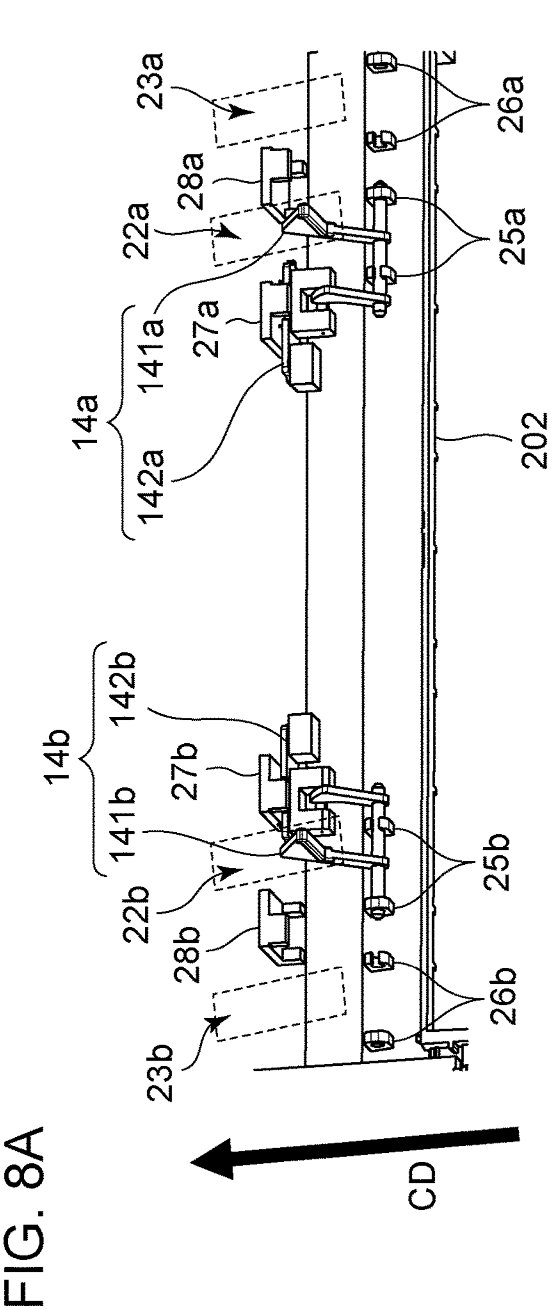
FIGS. 8A and 8B are diagrams illustrating mounting structures of width detectors according to example 1.
Figure 8B:
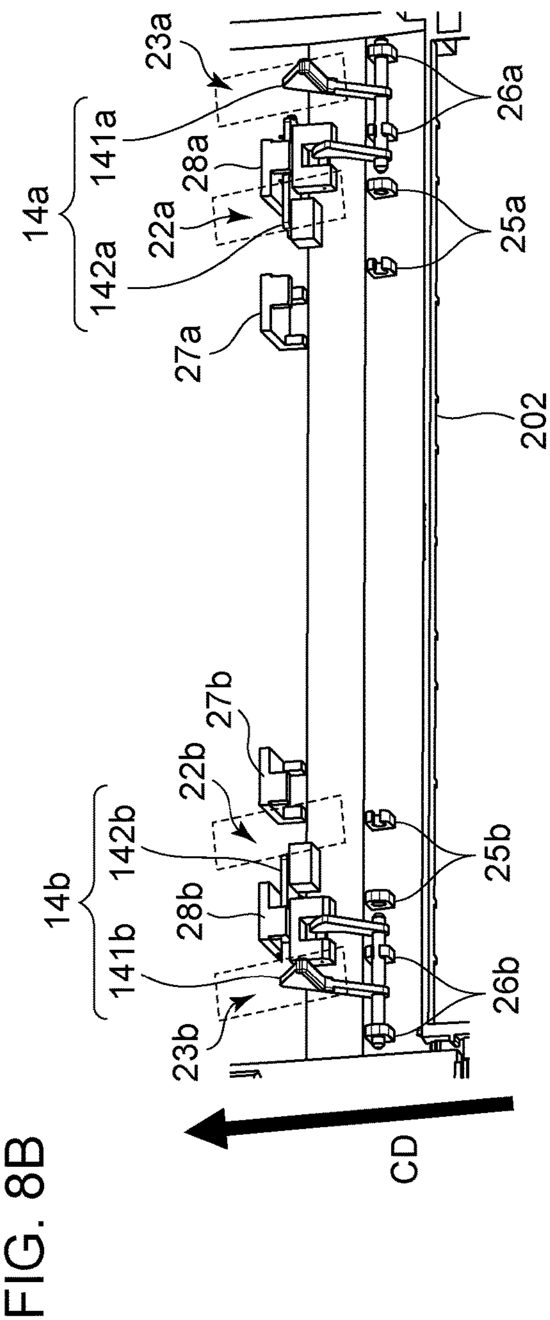

FIG. 8A is a perspective view of a portion of the frame unit 20 with the sheet width sensors 14*a* and 14*b* secured in the mounting holes 22*a* and 22*b* (first printer). FIG. 8B is a perspective view of a portion of the frame unit 20 with the sheet width sensors 14*a* and 14*b* secured in the mounting holes 23*a* and 23*b* (second printer). It should be noted that FIGS. 8A and 8B are diagrams of the frame unit 20 with the guide portion 201 removed, as viewed in substantially the same direction as FIG. 4.

As illustrated in FIGS. 8A and 8B, the frame unit 20 has the base portion 202 inside the guide portion 201, and the sheet width sensors 14*a* and 14*b* are supported by the base portion 202. The sheet width sensor 14*a* includes a sensor lever 141*a* and a photosensor 142*a* on which the sensor lever 141*a* acts. Similarly, the sheet width sensor 14*b* has a sensor lever 141*b* and a photosensor 142*b*. When an end of the recording material S that is being conveyed abuts the sensor lever 141*a*, the sensor lever 141*a* pivots toward the light receiving portion to block the light from the light emitting portion of the photosensor 142*a* and detects the passage of the recording material S. Similarly, when an end of the recording material S that is being conveyed abuts the sensor lever 141*b*, the sensor lever 141*b* pivots toward the light receiving portion to block the light from the light emitting portion of the photosensor 142*b* and detects the passage of the recording material S. When combined, the two outputs of the sheet width sensors 14*a* and 14*b* enable the width of the recording material S to be detected.

A lever mount portion 25*a* to which the sensor lever 141*a* is pivotably attached and a sensor mount portion 27*a* to which the photosensor 142*a* is attached are provided in a portion of the base portion 202 that corresponds to the mounting hole 22*a*. In addition, a lever mount portion 25*b* to which the sensor lever 141*b* is pivotably attached and a sensor mount portion 27*b* to which the photosensor 142*b* is attached are provided in a portion of the base portion 202 that corresponds to the mounting hole 22*b*. In addition, a lever mount portion 26*a* to which the sensor lever 141*a* is pivotably attached and a sensor mount portion 28*a* to which the photosensor 142*a* is attached are provided in a portion of the base portion 202 that corresponds to the mounting hole 23*a*. In addition, a lever mount portion 26*b* to which the sensor lever 141*b* is pivotably attached and a sensor mount portion 28*b* to which the photosensor 142*b* is attached are provided in a portion of the base portion 202 that corresponds to the mounting hole 23*b*.

As described above, the first printer and the second printer each include the fixing unit that fixes a toner image to the recording material while heating the recording material on which the toner image has been formed. In addition, the first printer and the second printer each include the frame unit having the guide portion that guides the recording material to be conveyed to the fixing unit and the width detector provided in a portion of the frame unit in which the guide portion is provided to detect the width of the recording material. Furthermore, the frame unit has the first mounting hole to which the width detector is attached and the second mounting hole provided at a position, in an area provided with the guide portion, that differs from the position of the first mounting hole in the width direction of the recording material. The second mounting hole is a hole to which the width detector is attachable but not attached.

In this structure, the frame unit 20 has the lever mount portions 25*a*, 25*b*, 26*a*, and 26*b* and the sensor mount portions 27*a*, 27*b*, 28*a*, and 28*b* that correspond to the four mounting holes 22*a*, 22*b*, 23*a*, and 23*b*, respectively. Accordingly, the printer 1 (first printer) and the second printer can share the same frame unit 20.

Example 2

Next, example 2 will be described. It should be noted that the same components as those described in example 1 are denoted by the same reference numerals. Sheet width sensors 14*a*21 and 14*b*21 corresponding to the printer 1 (first printer) are provided in FIG. 9A, and sheet width sensors 14*a*22 and 14*b*22 corresponding to the second printer are provided in FIG. 9B.

Figure 9A:
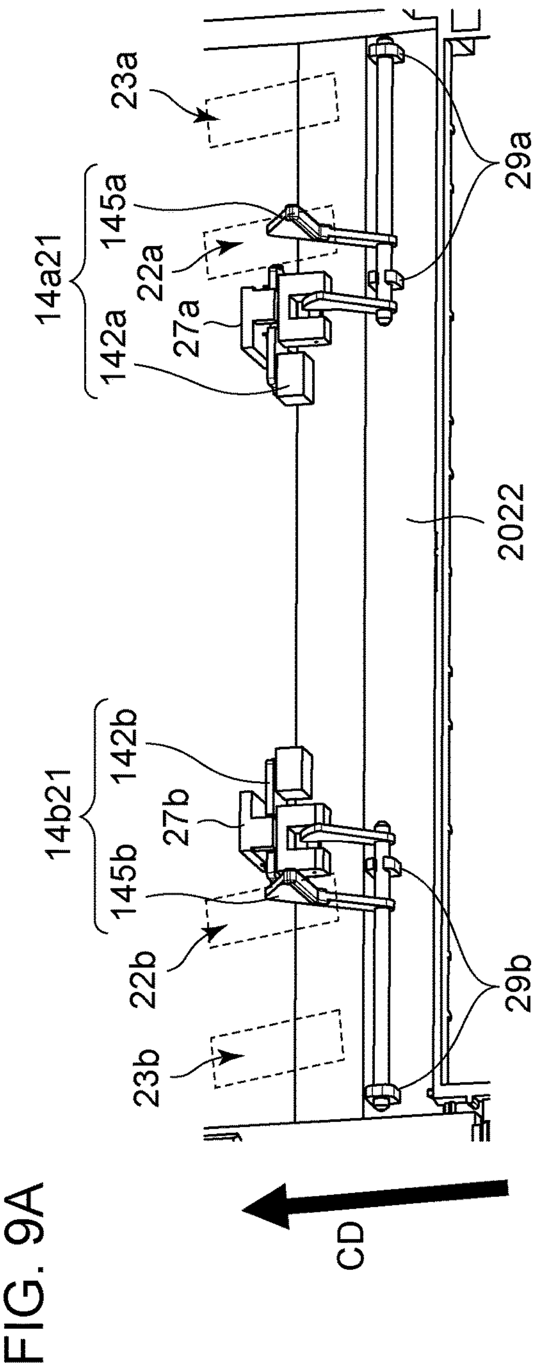
FIGS. 9A and 9B are diagrams illustrating mounting structures of width detectors according to example 2.
Figure 9B:
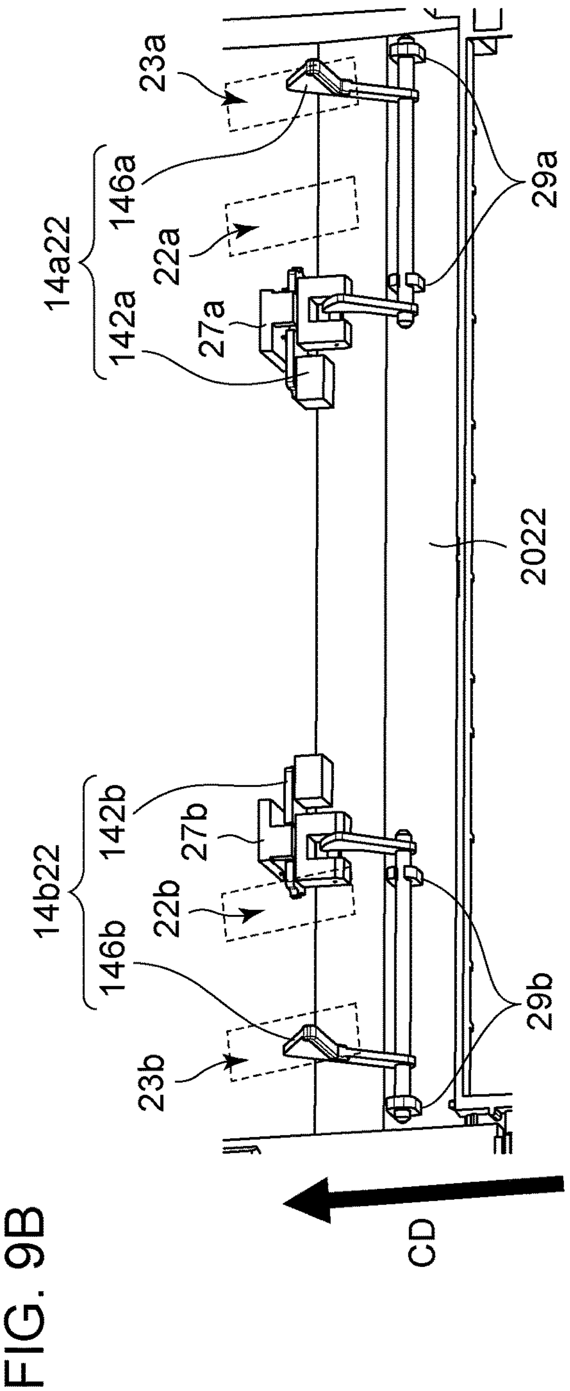

As illustrated in FIG. 9A, the sheet width sensor 14*a*21 of the printer 1 includes a sensor lever 145*a* and the photosensor 142*a*, and the sheet width sensor 14*b*21 includes a sensor lever 145*b* and the photosensor 142*b*. In addition, as illustrated in FIG. 9B, the sheet width sensor 14*a*22 of the second printer includes a sensor lever 146*a* and the photosensor 142*a*, and the sheet width sensor 14*b*22 includes a sensor lever 146*b* and the photosensor 142*b*. The positions of the photosensors 142*a* and 142*b* in the printer 1 (first printer) are identical to those in the second printer, and the positions of the sensor mount portions 27*a* and 27*b* in the printer 1 are also identical to those in the second printer. The two types of sensor levers 145*a* and 146*a* having different portions abutted by the recording material S can be attached to a sensor mount portion 29*a*. In addition, the two types of sensor levers 145*b* and 146*b* having different portions of the sensor levers abutted by the recording material S can be attached to a sensor mount portion 29*b*.

As described above, the frame unit according to the example has one portion to which the photosensor is attached with respect to the two holes including the first mounting hole and the second mounting hole. According to the example, the structure of a base portion 2022 of the frame unit that can be used by both the printer 1 (first printer) and the second printer can be simplified.

Example 3

Figure 10A:
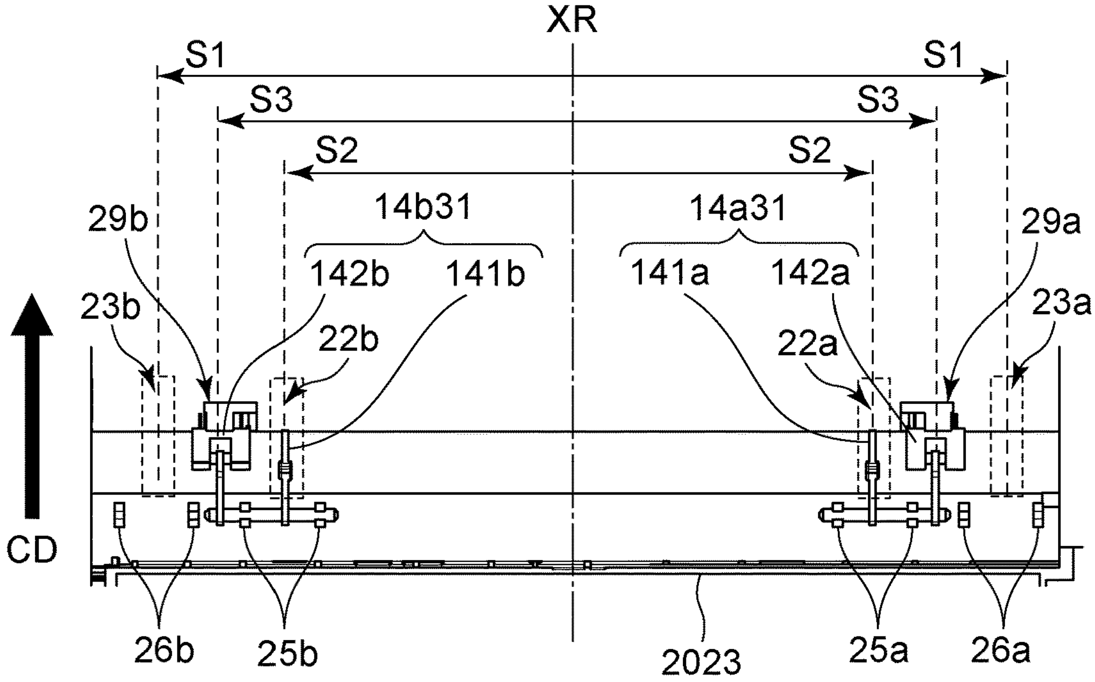
FIGS. 10A and 10B are diagrams illustrating mounting structures of width detectors according to example 3.
Figure 10B:
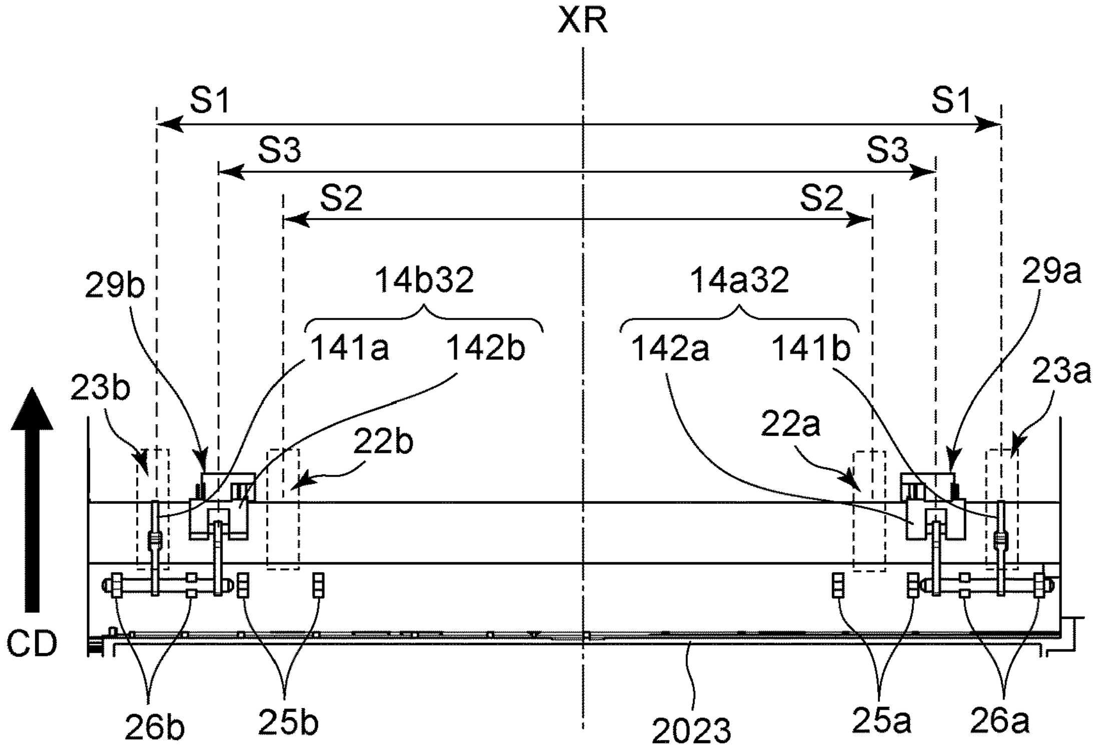

Next, example 3 will be described. It should be noted that the same components as those described in example 1 are denoted by the same reference numerals. FIG. 10A illustrates the structure of the frame unit corresponding to the printer 1 (first printer), and FIG. 10B illustrates the structure of the frame unit corresponding to second printer. The difference from example 1 is that there is only one pair of sensor mount portions 29*a* and 29*b*.

As illustrated in FIG. 10A, a sheet width sensor 14*a*31 of the first printer includes the sensor lever 141*a* and the photosensor 142*a*, and a sheet width sensor 14*b*31 includes the sensor lever 141*b* and the photosensor 142*b*. In addition, as illustrated in FIG. 10B, a sheet width sensor 14*a*32 of the second printer includes the sensor lever 141*b* and the photosensor 142*a*, and a sheet width sensor 14*b*32 includes the sensor lever 141*a* and the photosensor 142*b*.

Here, a distance S3 in the sheet width direction at which the photosensors 142*a* and 142*b* are disposed is set to a distance between the distances S1 and S2, which are two width detection positions between which the throughput is changed, that is, set to the distance $S3=(S1+S2)/2$. As illustrated in FIG. 10A, the sensor levers 141*a* and 141*b* can be disposed at the distance S2 by the sensor levers 141*a* and 141*b* being disposed in the mount portions 25*a* and 25*b*, respectively. In addition, as illustrated in FIG. 10B, the sensor levers 141*a* and 141*b* can be disposed at the distance S2 by the sensor levers 141*a* and 141*b* being disposed in at the mount portions 26*b* and 26*a*, respectively.

As described above, the frame unit according to the example has the photosensors at intermediate positions between the first mounting hole and the second mounting hole in the width direction. According to the example, a plurality of pairs of mount portions of the frame units need not be provided in a base portion 2023 of the frame unit that can be used by both the first printer and the second printer. In addition, since the pair of sensor levers 141*a* and 141*b* can be shared by the first printer and the second printer, a plurality of pairs of sensor levers 141*a* and 141*b* need not be provided.

Example 4

Figure 11A:
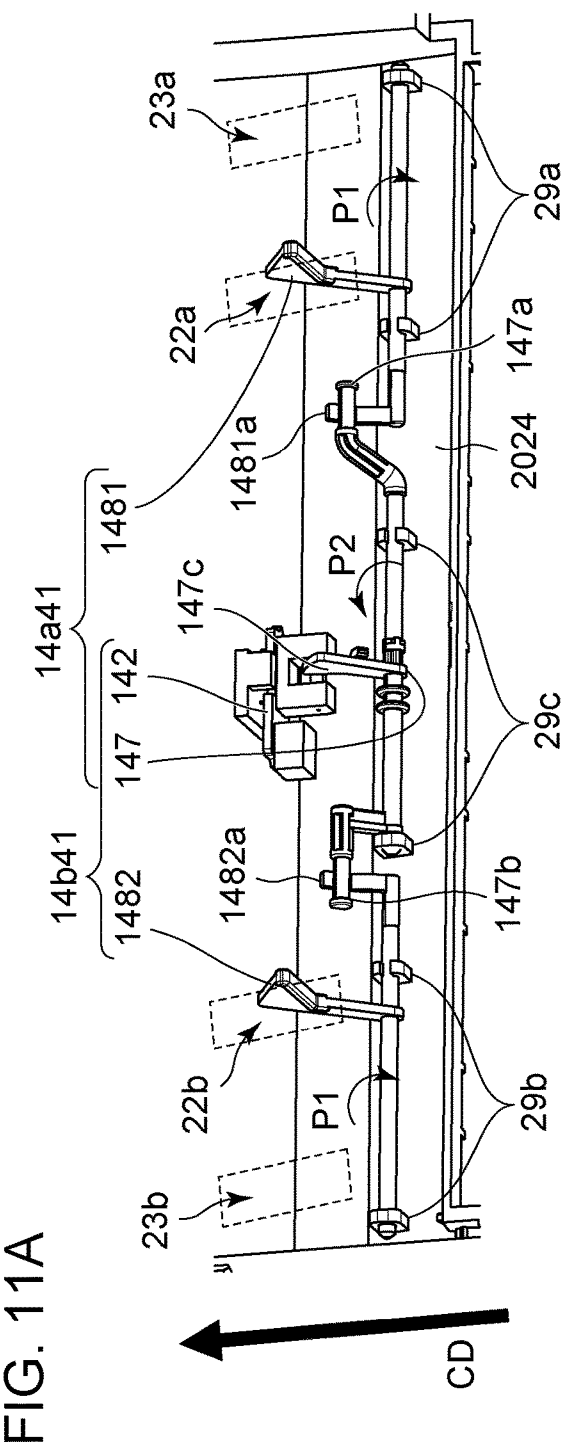
FIGS. 11A and 11B are diagrams illustrating mounting structures of width detectors according to example 4.

Next, example 4 will be described. It should be noted that the same components as those described in example 1 are denoted by the same reference numerals. FIG. 11A illustrates the structure of the frame unit corresponding to the printer 1 (first printer), and FIG. 11B illustrates the structure of the frame unit corresponding to the second printer.

As illustrated in FIG. 11A, a sheet width sensor 14*a*41 of the first printer has a sensor lever 1481 that correspond to the mounting hole 22*a*, a linkage member 147, and a photosensor 142. In addition, a sheet width sensor 14*b*41 of the first printer has a sensor lever 1482 that correspond to the mounting hole 22*b*, the linkage member 147, and the photosensor 142. The sensor levers 1481 and 1482 are supported by the lever mount portions 29*a* and 29*b* of the base portion 2024, respectively, and are urged in a P1 direction by a spring member, which is not illustrated. The linkage member 147 is supported by a link mount portion 29*c* of the base portion and is urged in a P2 direction in the diagram. The sensor levers 1481 and 1482 include arm portions 1481*a* and 1482*a*, respectively. In addition, the linkage member 147 includes abutment portions 147*a* and 147*b* and a light shielding portion 147*c*. Movement of the linkage member 147 in a rotational direction P2 is restricted by an abutment portion 147*a* abutting an arm portion 1481*a* and an abutment portion 147*b* abutting an arm portion 1482*a*. Here, as long as the urging force in the P1 direction>the urging force in the P2 direction and the linkage member 147 abuts either the sensor lever 1481 or 1482, the linkage member 147 does not move against the urging force of the sensor lever. When the recording material S passes and then the sensor levers 1481 and 1482 move in a direction opposite to the P1 direction against the urging force, the restriction of movement of the linkage member 147 in the P2 direction is released, and the linkage member 147 rotates in the P2 direction. Then, when the light shielding portion 147*c* of the linkage member 147 blocks the light from the photosensor 142, passage of the recording material S that is larger than the distance between sensor levers 1481 and 1482 is detected.

Figure 11B:
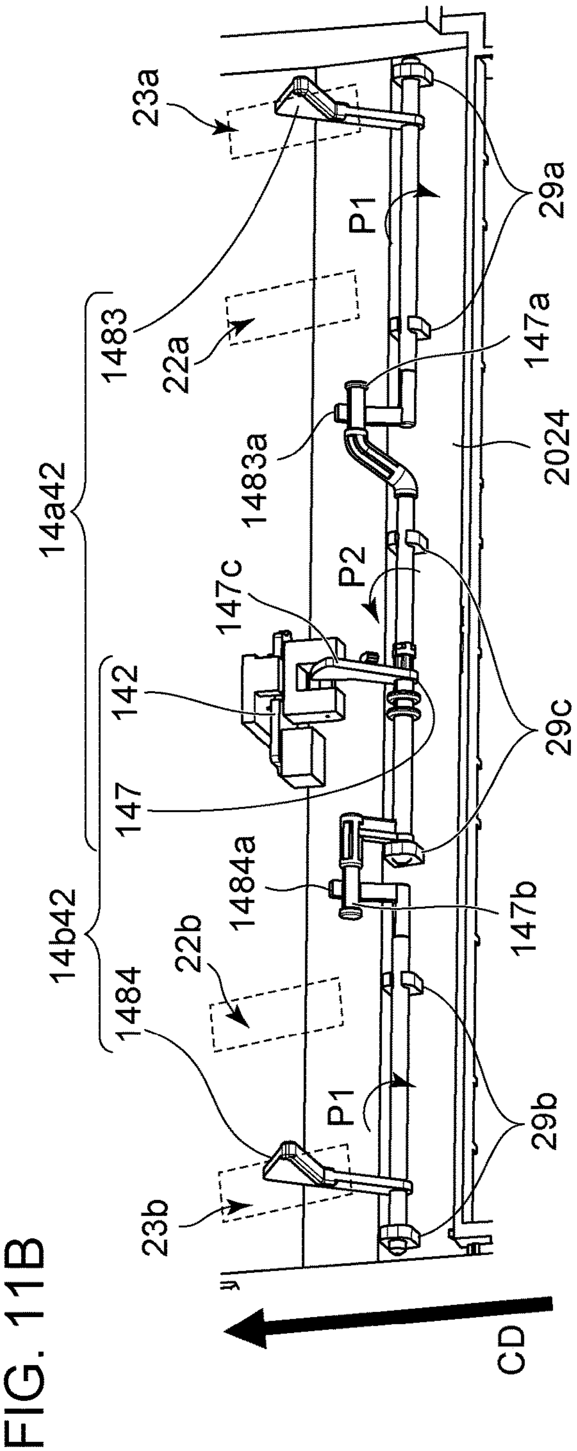

The structure of the second printer illustrated in FIG. 11B is also similar. It should be noted that a sheet width sensor 14*a*42 of the second printer includes a sensor lever 1483 that correspond to the mounting hole 23*a*, the linkage member 147, and the photosensor 142. In addition, a sheet width sensor 14*b*42 of the second printer includes a sensor lever 1484 that corresponds to the mounting hole 23*b*, the linkage member 147, and the photosensor 142.

As described above, the width detector according to the example includes a pair of sensor levers abutted by the recording material and one photosensor on which the pair of sensor levers acts. According to the example, the number of photosensors 142, which are electrical components, can be reduced.

Example 5

Figure 12:
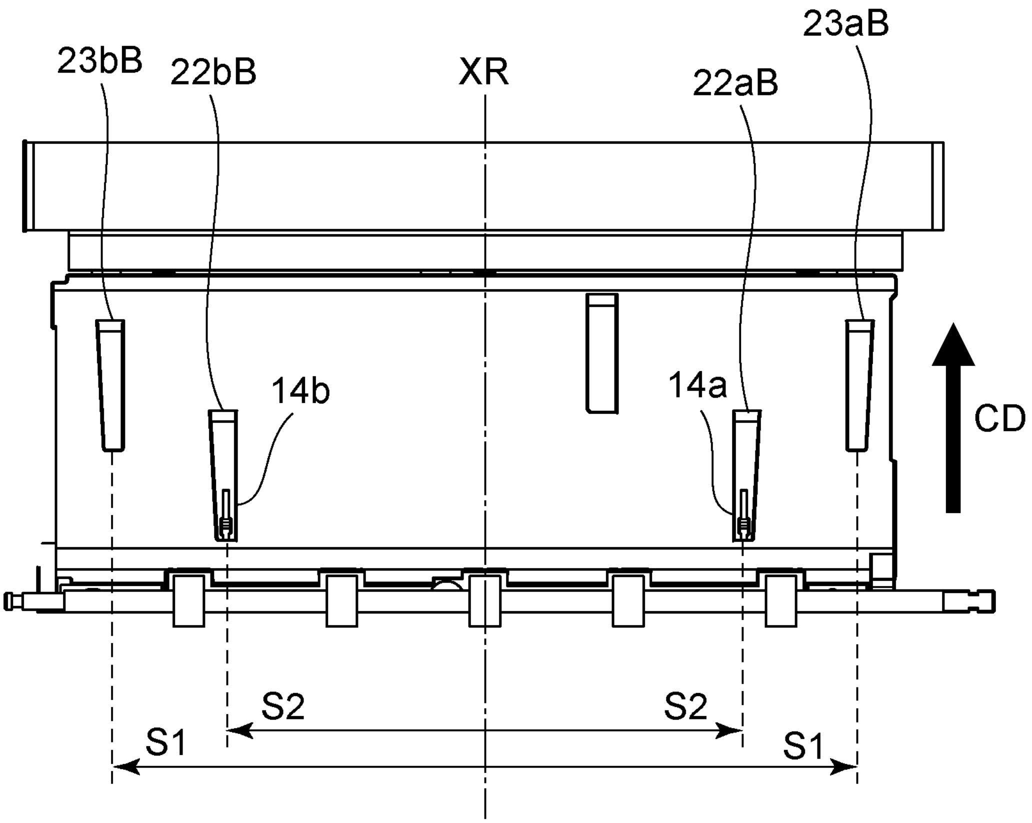
FIG. 12 is a diagram illustrating a mounting structure of width detector according to example 5.

Next, example 5 will be described. It should be noted that the same components as those described in example 1 are denoted by the same reference numerals. FIG. 12 illustrates the structure of the frame unit that supports the printer 1 (first printer) and the second printer. It should be noted that the positions of the sheet width sensors 14*a* and 14*b* in FIG. 12 correspond to those in the first printer.

As illustrated in FIG. 12, the position of mounting holes 22*a*B and 22*b*B is not aligned with the position of mounting holes 23*a*B and 23*b*B in the conveyance direction CD of the recording material S.

In the structure according to the example, even when the difference between the distance S1 and the distance S2 is small, a plurality of lever mount portions can be easily disposed in the base portion of the frame unit.

Example 6

Next, example 6 will be described. It should be noted that the same components as those described in example 1 are denoted by the same reference numerals.

Figure 13:
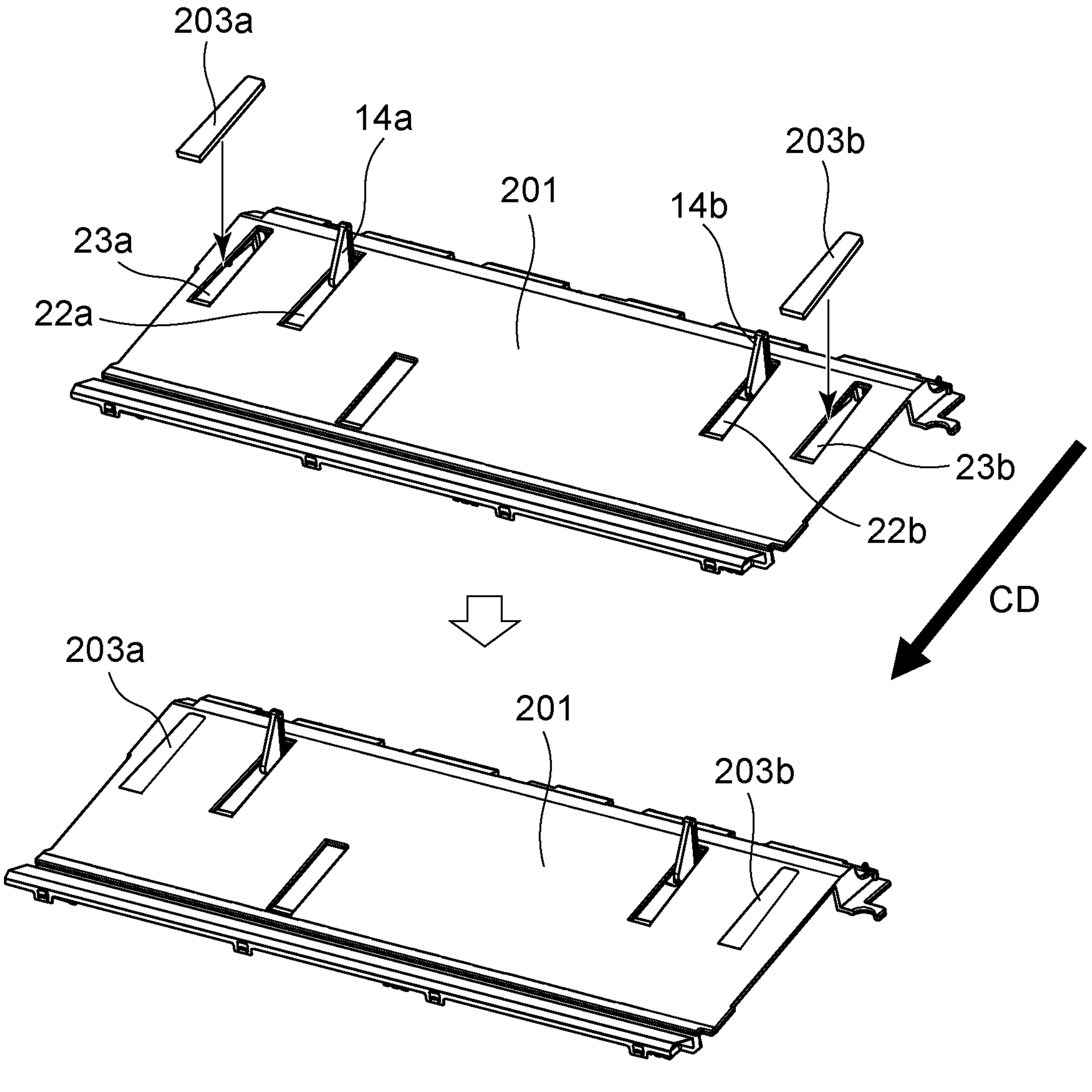
FIG. 13 is a diagram illustrating a mounting structure of width detector according to example 6.

As illustrated in FIG. 13, in the example, the mounting holes 23*a* and 23*b* to which the sheet width sensors 14*a* and 14*b* are not attached are covered with cover members 203*a* and 203*b*.

When the sheet width sensors 14*a* are secured in the mounting holes 23*a* and 23*b*, the mounting holes 22*a* and 22*b* can be covered with the cover members 203*a* and 203*b*.

Conveyance of the recording material S can be prevented from being degraded by the unused mounting holes by these holes being covered as in the example.

The sensor lever that moves when abutted by the recording material S is used as the width detector in examples 1 to 6 described above, but an optical sensor that illuminates the recording material S with light and receives the reflected light may be used instead of the sensor lever.

While the present disclosure has been described with reference to exemplary embodiments, it is to be understood that the disclosure is not limited to the disclosed exemplary embodiments. The scope of the following claims is to be accorded the broadest interpretation so as to encompass all such modification examples and equivalent structures and functions.

This application claims the benefit of Japanese Patent Application No. 2023-034300, filed Mar. 7, 2023, which is hereby incorporated by reference herein in its entirety.

What is claimed is:

1. An image forming device comprising:

a fixing unit configured to fix a toner image to a recording material while heating the recording material on which the toner image is formed;

a frame unit provided with a guide plate configured to guide the recording material to be conveyed to the fixing unit; and a width detector configured to detect a width of the recording material, wherein the width detector is provided in a portion of the frame unit in which the guide plate is provided, wherein the frame unit has a first mounting hole to which the width detector is attached and a second mounting hole, wherein the second mounting hole is provided at a position that differs from a position of the first mounting hole in a width direction of the recording material, the second mounting hole further is provided in the portion of the frame unit in which the guide plate is provided, and the width detector is attachable in the second mounting hole but not attached to the second mounting hole, wherein the fixing unit includes a first temperature detection element and a second temperature detection element provided at a position farther away from a conveyance reference of the recording material as a reference for conveying the recording material while centering the recording material in the width direction than the first temperature detection element, and wherein the second mounting hole is provided at a position farther away from the conveyance reference than the first mounting hole in the width direction and coincides with the position of the second temperature detection element in the width direction.

2. The image forming device according to claim 1, wherein the width detector includes a sensor lever abutted by the recording material and a photosensor on which the sensor lever is configured to act, and the frame unit has one portion to which the photosensor is attached with respect to two holes including the first mounting hole and the second mounting hole.

3. The image forming device according to claim 1, wherein the width detector has a sensor lever abutted by the recording material and a photosensor on which the sensor lever is configured to act, and the frame unit has the photosensor at an intermediate position between the first mounting hole and the second mounting hole in the width direction.

4. The image forming device according to claim 1, wherein the width detector includes a pair of sensor levers abutted by the recording material and one photosensor on which the pair of sensor levers is configured to act.

5. The image forming device according to claim 1, wherein the first mounting hole is not aligned with the second mounting hole in a direction in which the recording material is conveyed.

6. The image forming device according to claim 1, wherein the second mounting hole is blocked by a cover member.

7. An image forming device comprising:

a fixing unit configured to fix a toner image to a recording material while heating the recording material on which the toner image is formed;

a frame unit provided with a guide plate configured to guide the recording material to be conveyed to the fixing unit; and a width detector configured to detect a width of the recording material, wherein the width detector is provided in a portion of the frame unit in which the guide plate is provided, wherein the frame unit has a first mounting hole to which the width detector is attached and a second mounting hole, wherein the second mounting hole is provided at a position that differs from a position of the first mounting hole in a width direction of the recording material, the second mounting hole further is provided in the portion of the frame unit in which the guide plate is provided, and the width detector is attachable in the second mounting hole but not attached to the second mounting hole, wherein the fixing unit includes a first temperature detection element and a second temperature detection element provided at a position farther away from a conveyance reference of the recording material, which serves as a reference for aligning a side of the recording material parallel to a conveying direction during conveying the recording material, than the first temperature detection element, and wherein the second mounting hole is provided at a position farther away from the conveyance reference than the first mounting hole in the width direction and coincides with the position of the second temperature detection element in the width direction.

8. The image forming device according to claim 7, wherein the width detector includes a sensor lever abutted by the recording material and a photosensor on which the sensor lever is configured to act, and the frame unit has one portion to which the photosensor is attached with respect to two holes including the first mounting hole and the second mounting hole.

9. The image forming device according to claim 7, wherein the width detector has a sensor lever abutted by the recording material and a photosensor on which the sensor lever is configured to act, and the frame unit has the photosensor at an intermediate position between the first mounting hole and the second mounting hole in the width direction.

10. The image forming device according to claim 7, wherein the width detector includes a pair of sensor levers abutted by the recording material and one photosensor on which the pair of sensor levers is configured to act.

11. The image forming device according to claim 7, wherein the first mounting hole is not aligned with the second mounting hole in a direction in which the recording material is conveyed.

12. The image forming device according to claim 7, wherein the second mounting hole is blocked by a cover member.

* * * * *